United States Patent
Ferschel et al.

(10) Patent No.: US 8,867,801 B2
(45) Date of Patent: Oct. 21, 2014

(54) METHOD FOR DETERMINING PROPERTIES OF A VESSEL IN A MEDICAL IMAGE

(75) Inventors: Sigrid Ferschel, Uttenreuth (DE); Stefan Lautenschläger, Hausen (DE)

(73) Assignee: Siemens Aktiengesellschaft, Munich (DE)

(*) Notice: Subject to any disclaimer, the term of this patent is extended or adjusted under 35 U.S.C. 154(b) by 1135 days.

(21) Appl. No.: 12/835,135

(22) Filed: Jul. 13, 2010

(65) Prior Publication Data

US 2012/0014574 A1    Jan. 19, 2012

(51) Int. Cl.
- *G06K 9/00* (2006.01)
- *G06T 7/60* (2006.01)
- *G06T 7/00* (2006.01)
- *G06K 9/62* (2006.01)

(52) U.S. Cl.
CPC ..... *G06T 7/0012* (2013.01); *G06T 2207/10072* (2013.01); *G06T 7/60* (2013.01); *G06T 2207/10116* (2013.01); *G06T 2207/30101* (2013.01)

USPC .......................................... 382/128; 382/131

(58) Field of Classification Search
CPC ............... G06T 7/0012; G06T 7/0083; G06T 2207/30004; G06T 7/0081; G06F 19/321
USPC ........................................................ 382/128
See application file for complete search history.

(56) References Cited

U.S. PATENT DOCUMENTS

2003/0053669 A1*  3/2003  Suri et al. .............. 382/130

* cited by examiner

Primary Examiner — Tran Nguyen

(57) ABSTRACT

A method and a system for determining properties of a vessel in a medical image are provided. The method involves displaying the medical image including the vessel. The displayed vessel is segmented and indicated in the medical image. For an indicated vessel, a maximum curvature along a length of the vessel is determined as the property of the vessel. Another vessel parameter which can be determined is the smallest diameter along the length of the vessel.

18 Claims, 7 Drawing Sheets

METHOD FOR DETERMINING PROPERTIES OF A VESSEL IN A MEDICAL IMAGE

FIELD OF THE INVENTION

The present invention relates to the field of analyzing medical images, particularly a method and system for determining properties of a vessel in a medical image.

BACKGROUND OF THE INVENTION

During a medical procedure, for example in a diagnostic angiographic procedure or an angiographic intervention a catheter is typically positioned into a vessel portion of choice. The access is typically via a vessel in the groin, in the aim or in the axilla. The advancement of a guide wire or the catheter can become very difficult since it has to follow the path of the vessel. Hence the selection of the material used to make the guide wire or catheter becomes very crucial. The selection of the material for the guide wire or catheter depends on many factors of which one important factor is the vessel situation or path because some materials are not flexible enough to follow a much curved vessel.

Malformations, for example tumors, can be treated using so called minimally invasive treatment in interventional angiography, interventional oncology, interventional surgery, or interventional neuroradiology. For this treatment, a specialist who could be a physician inspects images that had been acquired before the treatment using diagnostic imaging techniques. These techniques can be for example MR (Magnetic Resonance), CT (Computed Tomography) or angiographic acquisitions (X-ray Angiography), either 2-dimensional (2D) images or 3-dimensional (3D) volumes. One way to treat further growth of the malformations is by performing embolization, where the blood-flow to the malformation is reduced or even stopped by introducing an embolizing material into the feeding vessel of the malformation. For diagnosing, the physician needs to find the one or more feeding vessel which supply blood to the malformation. Also in the case of therapeutic procedures for the treatment, the placement of components, e.g. glue, microspheres, catheters etc. has to be placed ideally in the vessel and the injection of the therapeutic materials, for example the embolizing material has to be performed very precisely into the correct vessel.

In the case of catheter, the selection of the catheter is a compromise of a catheter that can easily be steered and that can be used for very tortuous vessels. Lack of knowledge of specific parameters of the vessels results in the choice of unsuitable catheters which get wasted during the actual procedures resulting in increased cost, increase duration and complexity of the procedure. Hence there is a need for knowing specific physiological characteristics of the vessels to arrive at more accurate decisions on the selection of these types of surgical or therapeutic components.

SUMMARY OF THE INVENTION

In view of the foregoing, an embodiment herein includes a method for determining properties of a vessel in a medical image. The method involves displaying the medical image including the vessel. The displayed vessel is segmented and indicated in the medical image. For an indicated vessel, a maximum curvature along a length of the segmented vessel is determined as the property of the vessel.

In view of the foregoing, another embodiment herein includes a system for determining properties of a vessel in a medical image. The system comprises a processor adapted for segmenting the vessel in the medical image. The system also has a display adapted to display the medical image and the segmented medical image of the vessel. The processor is further adapted to determining a maximum curvature along a length of the selected vessel as the property of the vessel.

According to the invention, a vessel is displayed in a medical image. The said vessel is then segmented and said segmented vessel is indicated and displayed in the medical image enabling the determination of a vessel property like a maximum curvature of the vessel. By knowing the maximum curvature information, a physician can take more accurate decisions on the selection of the type of surgical or therapeutic components that could be used during an intervention. For example, if the curvature of the vessel identified is high the physician can use a more flexible catheter than which he would have used for a less curvy vessel.

Having the indication of the segmented vessel in the medical image as proposed in the invention the physician can use the medical image to find the maximum curvature of the vessel and plan the catheter type based on this parameter of the vessel prior to the actual intervention. The prior planning also helps to speed up the actual procedure, since the required catheter type for a given vessel can be determined before said procedure based on the maximum curvature information.

BRIEF DESCRIPTION OF THE DRAWINGS

The present invention is further described hereinafter with reference to illustrated embodiments shown in the accompanying drawings, in which.

DETAILED DESCRIPTION OF THE INVENTION

Figure 1:
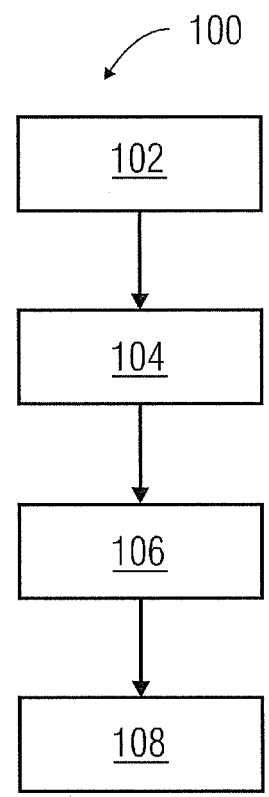
FIG. 1 illustrates a flow chart of a method for determining properties of a vessel in a medical image.

FIG. 1 illustrates a flow chart 100 of a method for determining properties of a vessel in a medical image. At step 102, medical image of a vessel is displayed. The medical image is a high resolution image. It is obtained using a commonly known medical 2D or 3D image acquisition. The 3D acquisition can be for example a 3D x-ray angiography, an MRI or a CT image acquisition; the 2D acquisition can be for example a digital angiography (DA) or a digital subtraction angiography (DSA). In a DSA a final medical image is generated as difference between two images, one with injecting a contrast agent and the other without injecting the contrast agent to the vessels.

At step 104, the vessel displayed in the medical image is segmented. Different algorithms known to a person skilled in the art can be used to perform the segmentation. One such segmenting process that can be employed is a region growing algorithm.

At step 106, the segmented feeding vessel is then indicated in the medical image. The segmented feeding vessel is indicated e.g. in different color with respect to the background of the medical image.

And at step 108, a maximum curvature along a length of the vessel is determined. The knowledge of the maximum curvature of the vessel helps the physician to make correct choice of the catheter having proper stiffness or flexibility which can be easily maneuvered through the vessel without much difficulty.

The medical image might contain a plurality of vessels. Depending on the intended procedure not all of these vessels will be relevant. According to an embodiment of the invention the medical image containing the plurality of vessels is displayed in step 102. In an additional step a vessel from the plurality of vessels is manually selected and only this selected vessel is segmented in step 104. This allows focusing only on the relevant vessel which for example is intended for medical procedure. Computing time is reduced since only one from the plurality of vessels needs to be segmented. One way of selecting the vessel is to provide a mark, for example a dot or a line in the desired vessel, for which the vessel parameters need to be determined.

According to another embodiment all the vessels are first segment and displayed in the medical image. Then only one from the plurality of vessels is selected to determine the maximum curvature. Displaying the plurality of vessels in the segmented form will make it easier to indentify the relevant vessel for further processing.

A segmented vessel can have multiple substantial curvatures along its length, based on the vessel situation inside a body part. Even though one of the parameter which is of interest to a user, for example a physician is the maximum curvature, the maximum curvature can also refer to a local maxima along the length of the vessel, so that the maximum curvature in several parts of the segmented vessel can be determined as a vessel property.

The vessel parameters that could be of interest to the physician are maximum curvature of the vessel, minimum diameter of the vessel or blood flow direction in the vessel. The knowledge of the vessel parameter helps the physician to make correct choice on the diameter, make, stiffness or flexibility of the catheter for the intervention. Based on these parameters the method may also include suggesting a type of catheter which is suitable for the vessel.

In another embodiment, the vessel parameter can be determined for a portion of the vessel based on the selection of the segmented vessel in the medical image. When a portion of the vessel is selected, the maximum curvature along the length of the selected portion of the vessel is determined. A portion of the vessel can be selected by providing marks at two points in the vessel, where the vessel between those two points are identified for finding the vessel parameter. The mark can even be a circle indicated on top of the vessel, whose circumference intersects the vessel at two points. Here the length of the vessel between the two points is the portion of the vessel for which a vessel parameter needs to be found. The selection of a portion of the vessel displayed in the medical image helps in finding the vessel parameter for the most relevant region which is interested to the physician thereby reducing the use of additional system resources and reducing the time of planning.

Figure 2:
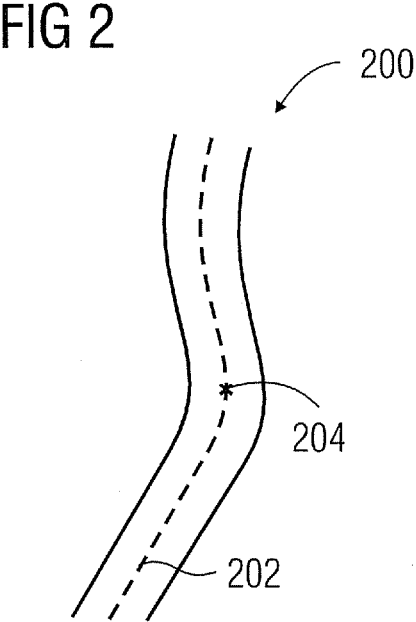
FIG. 2 shows a segmented vessel in a medical image, for which the maximum curvature is determined using the centerline.

FIG. 2 shows a segmented vessel 200 in a medical image, for which the maximum curvature of the centerline 202 is at point 204. In said embodiment, the maximum curvature of the vessel 200 corresponds to the maximum curvature at the point 204. This is one way to find the maximum curvature of a vessel or a selected part of the vessel. In this embodiment, the centerline of the selected vessel is computed and the maximum curvature of the center line is taken as the maximum curvature of the selected vessel. Any of the known algorithms used for finding the centerline of a vessel or a tubular structure can be employed in the method. Deriving the maximum curvature value from just the center line makes the process fast and simple.

Figure 3:
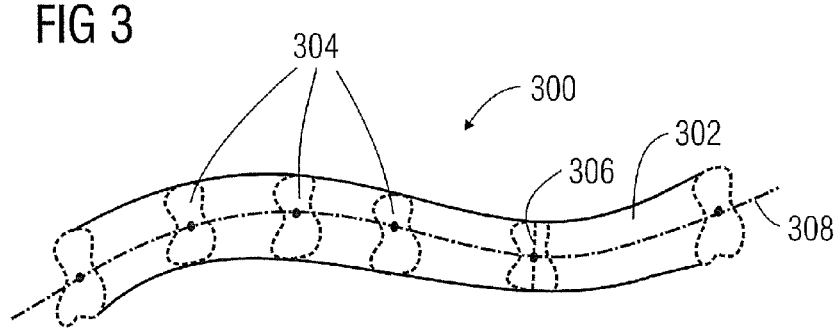
FIG. 3 shows a tubular structure, for which the maximum curvature is determined according to an embodiment of the invention.

FIG. 3 shows a segmented vessel 300, which is having a tubular structure 302 for which the maximum curvature need to be determined. The tubular structure 302 is segmented from a high resolution medical image, which provides the actual vessel situation inside a body part. The tubular structure 302 will have arbitrary cross sections 304 which are very much dependent on the actual vessel situation inside the body. The tubular structure represents very closely the three-dimensional properties of the vessel and hence leads to a very accurate determination of the curvature. The maximum curvature can, for example, be based on the Gaussian curvature of the tubular structure or based on other appropriate definitions of the curvature.

Figure 4:
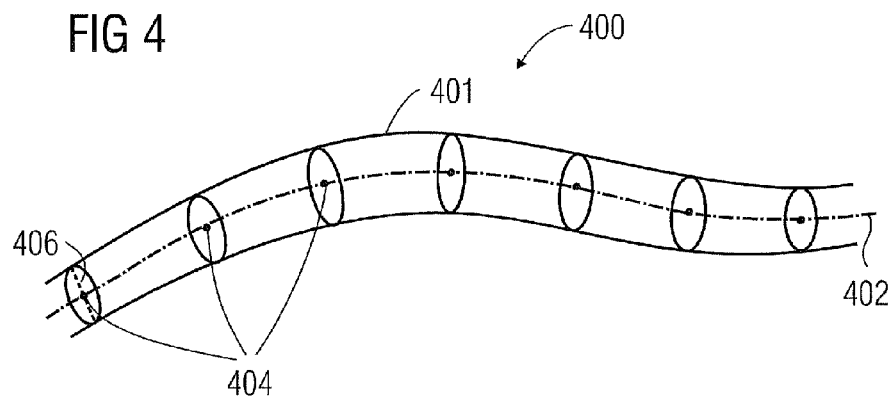
FIG. 4 shows an approximated tubular structure, for which the maximum curvature is determined according to an embodiment of the invention.

In another embodiment, FIG. 4 shows an approximated tubular structure 400, obtained for the selected portion of a segmented vessel in the medical image. In this embodiment, the centerline 402 of the selected vessel 401 is computed and then the average diameter of the vessel at different points 404 along the centerline 402 is computed. The average diameter at a point in the approximated tubular structure is computed from the cross section of the corresponding actual tubular structure, for example the one shown in FIG. 3 taken at a similar location along the length of the vessel. For example, the average diameter at a point of a vessel could be determined such that the area of a circle with this diameter is the same as the area of the cross-section of the vessel orthogonal to the centerline of vessel at the point. The points along the centerline 402 can for example have equal intervals. The closer the points are the better the approximation of the tubular structure of the vessel. The path of the centerline 402 and the diameter as a function of the points along the centerline 402 determine a three-dimensional approximation of the vessel as tubular structure with a circular cross-section. This approximation of the full tubular structure of the vessel, with circular cross-section, will provide an easier determination of the maximum curvature. The approximate tubular structure is like a hose with a circular cross section. In this embodiment the curvature of the vessel is approximated as the curvature of the approximate tubular structure. This approximated tubular structure itself is a 2D structure embedded in a 3D volume. The curvature of this 2D structure can be well defined for example as Gaussian curvature.

Determination of maximum curvature using centerline as explained using FIG. 2 does not require medical image of very high resolution, hence the said determination is preferred when the resolution of the medical image is relatively low. The accuracy of determined maximum curvature is highest when said determination is done using the tubular structure as explained using FIG. 3, since the tubular structure provides a real situation of the vessel inside a body part. At the same time said determination using the tubular structure requires a medical image of relatively high resolution. The maximum curvature deter mined using the approximated tubular structure has an accuracy lesser than that of the one determined using the tubular structure but generally higher than that of the one determined using the center line, since the tubular structure is only an approximated model and not an actual vessel situation.

The diameter information of the vessels is another vessel parameter which a physician might be interested in. Based on the above said embodiment, i.e. using the tubular structure, the smallest diameter information can be determined. In the case of the tubular structure, a centerline 308 is first determined and an average diameter at different points of a centerline is determined. The smallest average diameter computed at any one of these points is taken as the smallest diameter of the tubular structure. In FIG. 3, the smallest average diameter of one of the arbitrary cross sections 304 is computed and indicated as the smallest diameter 306 of the segmented tubular structure 300. Since the cross section of the tubular structure at a point in the centerline is not necessarily circular and rather has an arbitrary cross section, an average diameter is determined for the arbitrary cross section. The knowledge of smallest diameter of the vessel also enables a physician to choose an appropriate catheter having a specific diameter, so that the said catheter can pass through the region of the smallest diameter if the procedure is done through said vessel having the smallest diameter or to make a decision to avoid the vessel altogether for doing the procedure. The smallest diameter can also be found using the approximated tubular structure. One way of implementation is to select the points at equal intervals in the center line 402 as shown in FIG. 4 and find the diameter information at all these points. By this method a minimum diameter, which is the smallest diameter 406 of the vessel can also be identified, which is also shown in FIG. 4.

Figure 5:
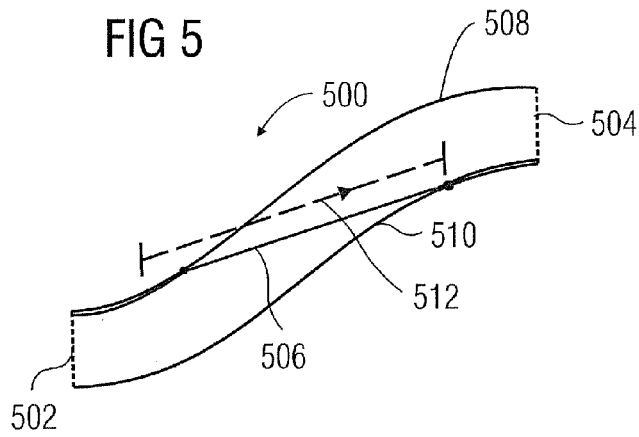
FIG. 5 shows a vessel as a tubular structure according to an embodiment of the invention, wherein the maximum curvature of the tubular structure is taken as the maximum curvature of a path having shortest distance between two ends of the vessel.

In the said above embodiments i.e. in the tubular structure or the approximated tubular structure the maximum curvature can also be taken as the maximum curvature of a path having shortest distance between two ends of the selected segmented vessel. FIG. 5 shows a tubular structure of a segmented vessel 500, selected in a medical image. The selected segmented vessel 500 extends from a first end 502 to a second end 504. For example, the shortest path a catheter can take to traverse from the first end 502 to the second end 504 is the path 506. In FIG. 5, the segmented vessel 500 comprises an upper wall 508 and a lower wall 510, which define the boundary of the segmented vessel 502, which is basically a 2D projection of a 3D vessel. In the region of the first end 502, the path 506 takes a route closer to the upper wall 508 and as the path 506 moves further away from the first end 502 it tends to take a straight route shown by the arrow 512 as a shortest possible route towards the lower wall 510. As the path reaches the region of the second end 504, the path 506 takes a route closer towards the lower wall 510, so as to minimize the length of the path 506. In this case, the curvature of the path 506 is taken as the maximum curvature of the tubular structure.

Figure 6:
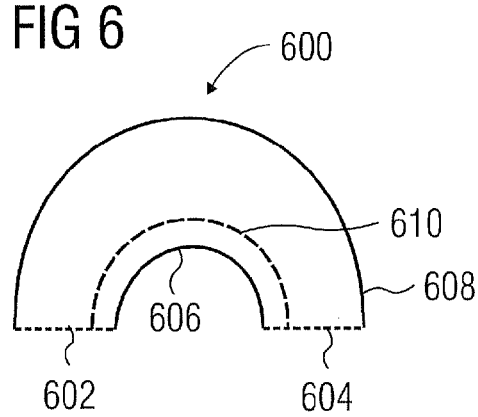
FIG. 6 illustrates an embodiment to find maximum curvature of a vessel based on a shortest path according to an embodiment of the invention.

FIG. 6 also illustrates an embodiment to find maximum curvature of a tubular structure 600, which is defined by a shortest path 610, internal to the tubular structure 600. For explanation, consider a tubular structure 600 having a first end 602 and a second end 604. The tubular structure also comprises a lower wall 606 and an upper wall 608 as boundaries. These two walls 606, 608 intuitively correspond to the outer and the inner side of the bend of the tubular structure 600. To make a shortest path, the path 610 takes a route as shown in the FIG. 6, which almost touches and follows the lower wall 606. Thus according to this embodiment, the curvature of the shortest path 606 can be taken as the maximum curvature of the tubular structure 600.

Figure 7:
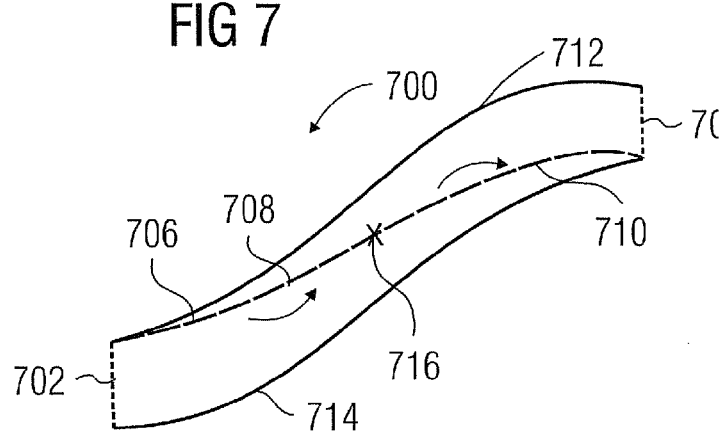
FIG. 7 illustrates an embodiment to find maximum curvature of a vessel based on a path having lowest curvature between two ends of a vessel, FIG. 8 also illustrates an embodiment to find maximum curvature of a vessel based on the lowest curvature of a path according to an embodiment of the invention.

In another embodiment, a curve inside a tubular structure is fitted such that its maximum linear curvature is minimal. Here the maximum curvature of the vessel 700 is defined as this maximum linear curvature of the curve. FIG. 7 also illustrates the maximum curvature of a curve 706 having lowest curvature between a first end 702 and a second end 704 of a vessel 700. Here the curve 706 does not have a straight path as shown in FIG. 5, but comprises of a first monotonously curved section 708 towards the first end 702 and a second monotonously curved section 710 towards the second end 704. The first section 708 aligns with an upper wall 712 towards the first end 702, whereas the second section 710 aligns with a lower wall 714 towards the second end 704. In a direction away from the first end 702, the first section 708 bends upwards until it reaches a turning point 716 which connects the first section 708 with the second section 710. From there on in the direction towards the second end 704, the second section 710 bends downwards. By avoiding a straight route as in FIG. 5 the length of the curved part of the two sections 708, 710 can be extended to reduce the maximum curvature.

Figure 8:
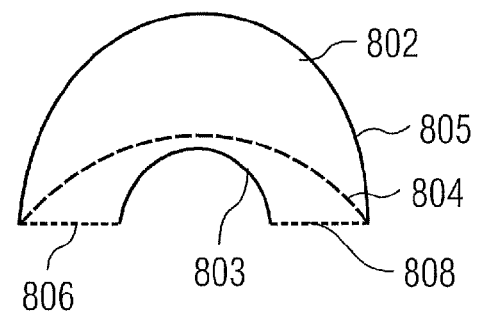

FIG. 8 also illustrates an embodiment to find maximum curvature of a tubular structure 802, which is defined by a lowest curvature of a curve 804, internal to the tubular structure. For explanation, consider a tubular structure 802, which is defined by a lower wall 803 and an upper wall 805 as boundaries as shown in FIG. 8. To make a curve of minimum curvature, the curve 804 takes a route as shown in the FIG. 8, which starts closer to the upper wall 805 at a first end 806 and almost touches and pass over the lower wall 803 in the way and finally ends close to the upper wall 805 at a second end 808. In this embodiment the maximum curvature of the vessel is defined as maximum curvature of the curve 804.

Figure 9:
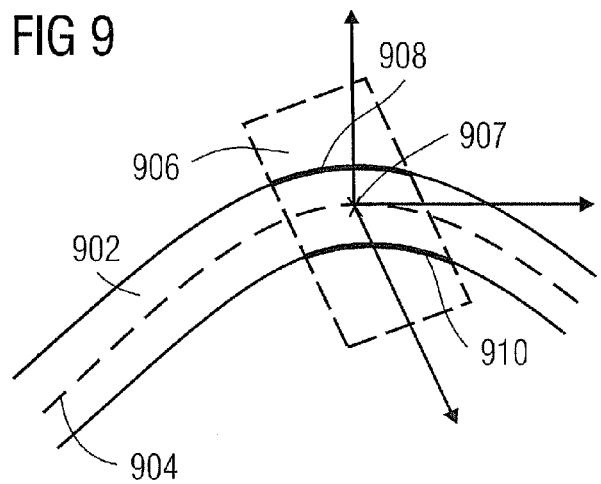
FIG. 9 shows a vessel, wherein the maximum curvature of the vessel is determined according to another embodiment of the invention.

FIG. 9 illustrates another embodiment to find the maximum curvature of the tubular structure or an approximated tubular structure. In this embodiment, a center line of the selected vessel is computed initially. The centerline at every point with a non-zero curvature of the selected vessel lies in a plane which intersects with the tubular structure to define two intersection lines. The maximum curvature of the selected vessel is defined as the curvature of either of these intersection lines. These two intersection lines intuitively correspond to the outer and the inner side of the bend of the vessel. FIG. 9 shows a segmented vessel 902, for which a centerline 904 is computed. A point 907 on the centerline 904 of the vessel lies in a plane 906. The vessel is oriented such that this plane 906 coincides with the plane of the drawing for simplicity. The plane 906 intersects the tubular structure to form a first intersection line 908 and a second intersection line 910 with the tubular structure of the segmented vessel 902. The curvature of any one of the intersecting line is taken as the maximum curvature of the tubular structure. The curvature can for example be taken always from the inside of the bend, i.e. from the intersection line 910 in this example, or from the outside of the bend, i.e. from intersection line 908 in this example. As an alternative, always the intersection line with the highest or lowest curvature could be chosen. In practice catheter will likely align itself with the inside or outside of the vessel in the plane of the bend direction. This realistic behavior is well reflected in the definition of the curvature described above, resulting in an accurate prediction of the required catheter flexibility.

The path or the curve whose maximum curvature is taken as that of the vessel under consideration are both good approximations of the actual path the catheter will take when maneuvered through the vessel and hence the maximum curvature of the path or the curve will be a good indication of the required flexibility of the catheter. The path with the shortest distance is closer to a very flexible catheter, whereas the curve with the smallest maximal curvature is closer to a stiff catheter. A person skilled in the art will be able to find other mathematical descriptions for simulating the path the catheter will take in the vessel to find other similar definitions of the curvature.

The blood flow direction is also another parameter of the vessel which might be of interest to the physician and hence is determined according to another embodiment of the invention. According to this embodiment, identifying the blood flow direction involves determining a diameter of the vessel in at least two places along a length of the vessel, wherein the blood flow direction is identified as the direction of a decreasing diameter of the feeding vessel. The blood flow direction is an additional vessel parameter, the physician might be interested in because the said information aids the physician during catheterization.

Figure 10:
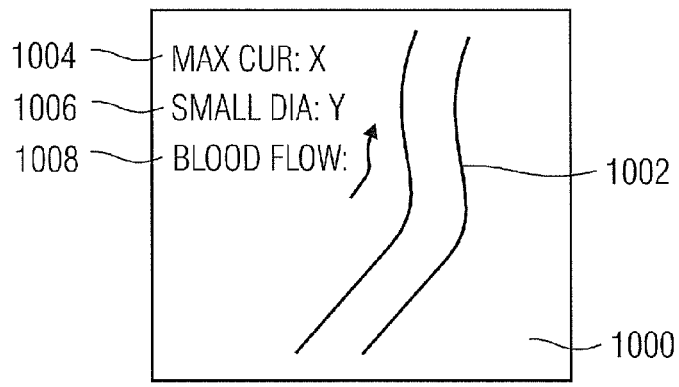
FIG. 10 illustrates a medical image where the values of vessel parameters are indicated according to the embodiment of the invention.

In all the above embodiments, the maximum curvature value is indicated in the medical image. The maximum curvature value is indicated with reference to the vessel on the medical image. There could be multiple ways the curvature value is displayed in the medical image. One way is to display the value at a suitable location in the medical image away from the vessel. FIG. 10 shows a vessel 1002 in a medical image 1000. The value 1004 for maximum curvature is displayed in the left top corner of the medical image as value X. Other vessel parameter values, for example the smallest diameter 1006 as represented by value Y and blood flow direction 1008 as indicated by an arrow are also indicated in the medical image 1000. The information on other vessel parameters for example the value of the smallest diameter of the vessel or the blood flow direction in the vessel along with the maximum curvature information gives the physician a ready reference of the actual values and clinical information and helps him to precisely and accurately plan intervention procedures before the actual intervention.

Figure 11:
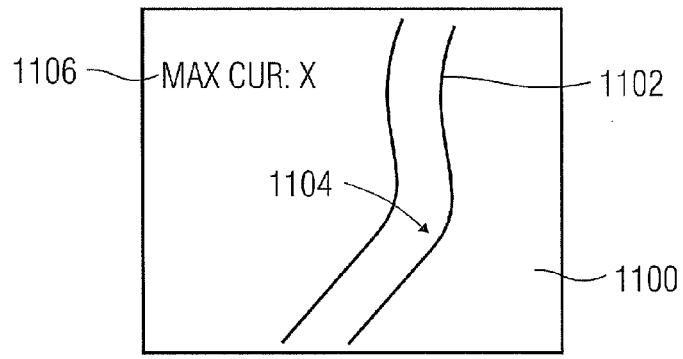
FIG. 11 illustrates a medical image where a value of vessel parameters is indicated by a pointer according to the embodiment of the invention.

FIG. 11 illustrates a medical image 1100 where a value of vessel parameters is indicated in another way by a pointer according to the embodiment of the invention. In FIG. 11, the region of maximum curvature of the vessel 1102 is pointed by a pointer or marker like an arrow 1104 and the value 1106 corresponding to the maximum curvature is displayed in the medical image 1100 with respect to the arrow 1104.

Figure 12:
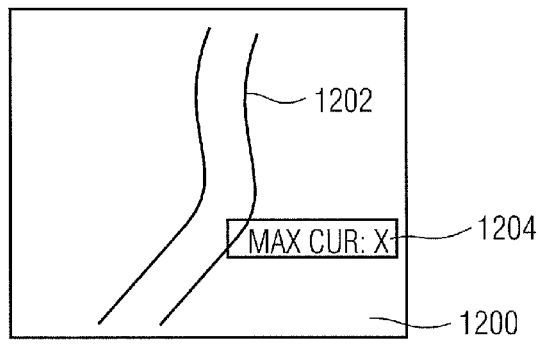
FIG. 12 illustrates a medical image where a value of vessel parameters is indicated at the region corresponding to that specific vessel parameter.

Yet in another embodiment as shown in FIG. 12, a value of vessel parameters is indicated at the region corresponding to that vessel parameter in a medical image 1200. The maximum curvature value 1204 of the vessel 1202 is indicated without any marker or arrow, at the region of the maximum curvature.

Figure 13:
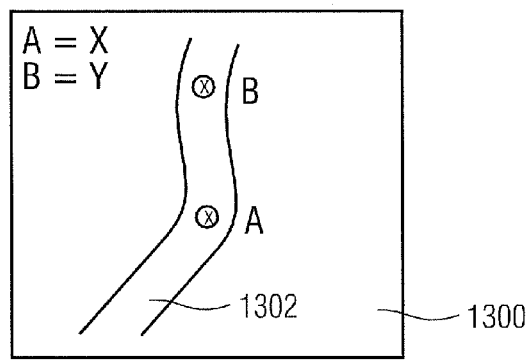
FIG. 13 illustrates a medical image, where vessel parameters at different locations of a vessel is indicated in the medical image.

In another embodiment, as shown in FIG. 13 a medical image 1300 is illustrated where vessel parameters at different locations of the vessel are indicated. In FIG. 13, curvature information at points A and B at two different locations in the same vessel 1302 is indicated. Here the maximum curvature at point A and point B are indicated as X and Y respectively. If there are multiple vessels the curvature values of all the vessels or the selected vessels can be displayed in the medical image. This helps the physician to precisely know the maximum curvature value and take inferences and make decisions on the selection of the catheter that is perfectly suitable for the said vessel.

Figure 14:
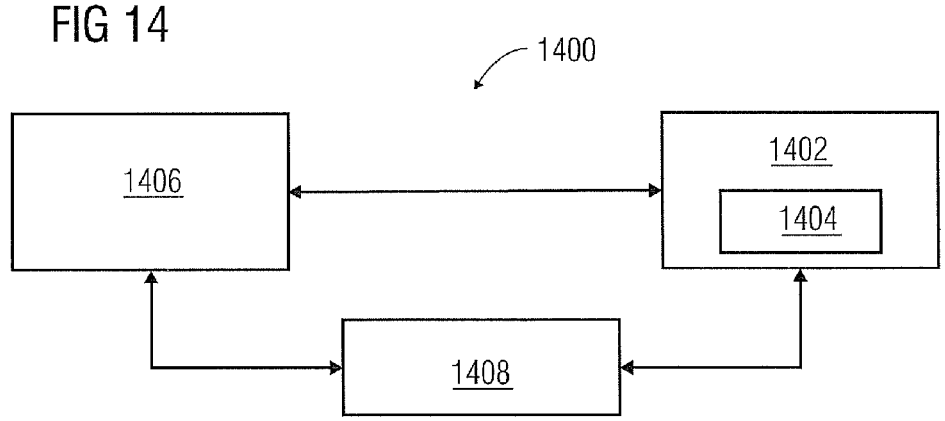
FIG. 14 illustrates a system for determining properties of a vessel in a medical image.

FIG. 14 illustrates a system 1400 for determining properties of a vessel in a medical image. The system 1400 can be a standard computer with a software application running on it which is adapted to enable the present invention. The system 1400 comprises a display 1402 adapted to display a medical image 1404 having a vessel, whose parameter has to be determined. The display 1402 is connected to a processor 1408, where said processor 1408 is used for segmenting the vessel in the medical image 1404. The physician can also manually select a segmented vessel in the medical image 1404 using a selector 1406. The selector 1406 is adapted to be used to select only a portion of the vessel, if required. The selector 1406, for example can be a graphic tool which can be used for highlighting or marking a specific portion in the medical image 1404. The selector 1406 is a functional element of the system 1400 which allows identifying a portion of the medical image by user interaction. The selector 1406 may be realized as a feature of a software program executed on the system 1400. The display 1402 further indicates the segmented feeding vessel and sub vessel in the medical image.

The processor 1408 determines a maximum curvature along a length of the segmented vessel as the property of the vessel, whose value is displayed on the medical image 1404. The processor 1408 can further identify a smallest diameter of the vessel or the blood flow direction as the property of the vessel, as explained using different embodiments in the invention.

In addition to the determination of the vessel parameters like the maximum curvature of the vessel and smallest diameter of the vessel it will be useful if the physician is provided a visual indication of the embolization prior to the actual intervention. Also it will be useful if the exact point which will be the intended catheter position at which the embolization material should be injected can be determined. For example till the intended catheter position, the vessel parameters provide critical information to the physician to select a catheter type and after the position the indication of the vessels affected by the embolization provides a simulation of the embolizartion prior to the actual intervention.

Currently, to perform an embolization procedure, repeated contrast-acquisitions and analysis of the images are required to find the correct position of the catheter, which finally makes the procedure difficult and time consuming, as well as dose and contrast agent intensive. Having the indication of the vessel in the medical image as proposed in the invention, the physician can additionally use the medical image to plan the catheter position or even simulate an embolization prior to the actual treatment thereby avoiding multiple contrast enhanced image acquisitions which otherwise would have been required. Avoiding multiple contrast enhanced image acquisitions reduces the risk of high dosage X-rays and contrast agents to the patient. Since the planning of the treatment can be done prior to the treatment the treatment itself can be made faster.

Figure 15:
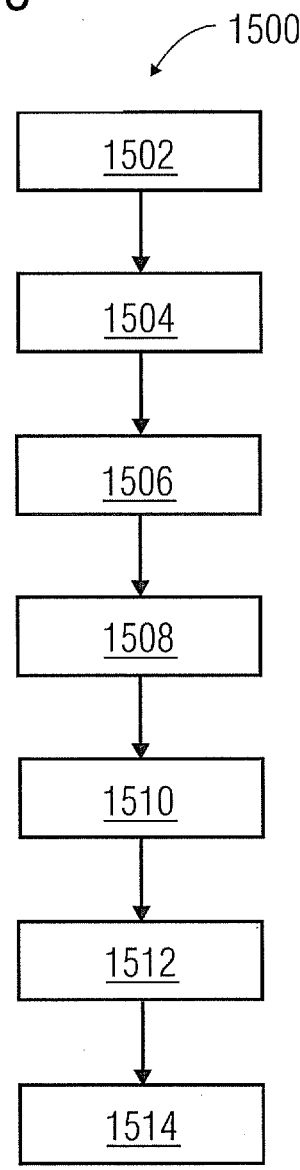
FIG. 15 illustrates a flow chart of a method for indicating a feeding vessel of a tumor as an example of a malformation in a medical image.

Accordingly, FIG. 15 illustrates a flow chart 1500 of a method for indicating a feeding vessel of a tumor as an example of a malformation in a medical image. The method involves displaying a high resolution medical image of a tumor and its surrounding vessels at step 1502. The surrounding vessel consists of a feeding vessel or a plurality of feeding vessels which supply blood to the tumor. At step 1504, the physician manually selects a portion of the displayed medical image in reference to the position of the tumor. In the embodiment described in reference to FIG. 15, the portion of the medical image selected is the tumor itself. Either a part of the tumor can be selected or the whole tumor of the feeding vessel. At step 1506, the feeding vessel of the tumor is segmented. The selection of the tumor at step 1504, initiates the automatic segmentation of the tumor itself as well as the feeding vessels of the tumor. Instead of the tumor the selection step 1504 and further work flow can be realized by selecting a feeding vessel by the physician. At step 1508, the segmented feeding vessel is then indicated in the medical image. At step 1510, the physician selects a point in the segmented feeding vessel. At step 1512, the blood flow direction at the selected point is identified. At step 1514, based on the blood flow direction at the selected point in the feeding vessel a part of the feeding vessel is indicated in the blood flow direction after the point. The indicated part of the vessel corresponds to the region which would be blocked if the embolizing material would be released at that point. The method therefore can be used to simulate the effect of the embolization procedure on the feeding vessel and the point selected in step 1510 corresponds to the point in the feeding vessel where the physician would like to inject an embolization material, for example using a catheter in this simulation. At the same time after the segmentation of the feeding vessel at step 1508, the physician will be interested to know the vessel parameters like the maximum curvature or the smallest diameter of the portion of the feeding vessel till a point in the feeding vessel along the direction of the blood flow where the physician would like to inject an embolization material. The selection of a point in the feeding vessel at step 1510 triggers the indication of a portion of the feeding vessel in an opposite direction to that of the indication of the feeding vessels as explained in step 1514.

Figure 16:
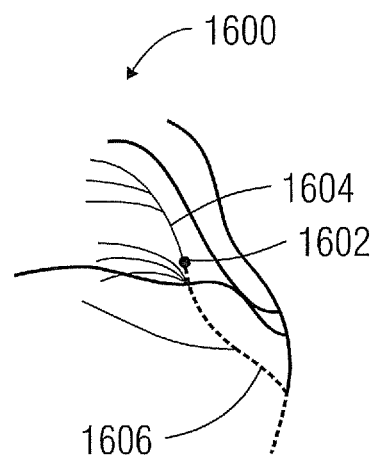
FIG. 16 illustrates a feeding vessel, where vessel parameter is determined for a portion of a feeding vessel.

FIG. 16 illustrates a feeding vessel 1600 and a point 1602 in the feeding vessel 1600 selected by the physician where the catheter can be positioned to inject an emboliozation material. Based on the selected point 1602, an indication of a portion 1606 of the feeding vessel 1600 can be provided in the medical image. The indicated portion 1606 is shown as a dotted line till the point 1602 and does not extend to distal vessel branches 1604 after the point 1602. To find a suitable point for the injection of the embolization material the point 1602 can be repositioned. In each repositioning the vessel parameters till the repositioned point in the blood flow direction can be determined. The vessel parameters in the blood flow direction up to the selected point 1602 are taken into consideration, since this will provide critical guidance to the physician for an intervention procedure.

Figure 17:
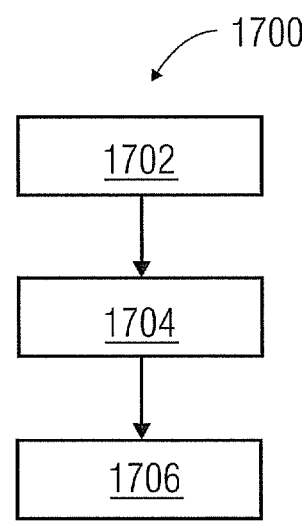
FIG. 17 illustrates a flow chart depicting the workflow to embolize a feeding vessel of a tumor.

Further the medical image, which contains the indication of the segmented malformation as well as the feeding vessels, can be fused with a live image acquired during the time, of the embolization procedure to provide an indication of the malformation as well as the feeding vessel in the live image. Accordingly, FIG. 17 illustrates a flow chart 1700 depicting the workflow to embolize a feeding vessel of a tumor. At step 1702, the medical image is obtained for which an intended catheter position was determined as explained in FIG. 15. The medical image can provide information on vessel parameters like maximum curvature and smallest diameter of the vessels, which is useful for the physician. At step 1704 a live image is obtained for the same tumor and the surrounding vessels which is generally a low resolution 2-dimensional image. At step 1706, the live image is overlaid with the medical image to obtain a fused image. By performing the overlaying, the planned position and the feeding vessels are clearly visible in the merged image, which provides the physician an orientation to move and place the catheter in said planned position. This guidance makes the whole treatment process faster comparing to the existing method of finding a proper catheter position during treatment using contrast-enhanced image acquisitions.

The present technique described hereinabove may also be used for indicating a feeding vessel of a malformation in a medical image For example, the malformation can be in uterus, liver or lungs. As previously noted the malformation may include a tumor, a fibroid or any other malformation which may be benign or cancerous. In the case of a malformation in the uterus, a high resolution medical image of the uterus region is obtained by using an MRI, since the use of MRI for imaging the uterus region minimizes exposure of radiation to the patient. The malformation and the feeding vessels are indicated in the medical image using the techniques described earlier with reference to FIG. 1. Thereafter, a live image which is a low resolution image of the uterus region is acquired. The live image is overlaid with the medical image to obtain a fused image, which contains the information regarding the location and extent of the malformation and the feeding vessels which helps the physician to see the actual position of the malformation and the feeding vessels before proceeding with the actual intervention. The described technique is useful for performing a uterine fibroid embolization technique, for treatment of fibroids present in the uterus region of the patient. The information regarding the location of the malformation and the feeding vessel in the live image obtained from the overlay is helpful in guiding the physician to instantly place a catheter in a desired position for applying the embolization material. This guidance makes the whole treatment process faster compared to the existing method of finding a proper catheter position during treatment using contrast-enhanced image acquisitions, and reduces contrast agent and X-ray dose.

The vessel is defined as any tubular anatomic structure of a human or an animal. In the embodiments described in reference to the figures the vessel is a blood vessel. However, the vessel can also be any other tubular structure including but not limited to bronchi, esophagus, and intestine.

The method for deter ruining properties of a vessel in a medical image can be implemented on a computer and hence the invention can also be realized as a computer readable medium with executable software code which, when executed on a computer, performed the method, based on the interaction with the physician.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

The invention claimed is:

1. A method for determining a property of a blood vessel in a medical image, comprising:
   displaying the medical image comprising the blood vessel on a display device;
   segmenting the blood vessel in the medical image by a processor;
   identifying the segmented blood vessel comprising a first end and a second end opposite to the first end by the processor;
   indicating the segmented blood vessel extending from the first end to the second end in the medical image on the display device;
   determining a shortest path on the segmented blood vessel that a catheter can take to traverse from the first end to the second end by the processor; and
   determining a maximum curvature of the shortest path along the segmented blood vessel as the property of the blood vessel by the processor.

2. The method according to claim 1, further comprising:
   computing a tubular structure of the segmented blood vessel; and
   determining a maximum curvature of the tubular structure as the maximum curvature of the blood vessel.

3. The method according to claim 2, further comprising:
   computing a centerline of the segmented blood vessel,
   wherein the centerline at every point with a non-zero curvature of the segmented blood vessel lies in a plane which intersects with the tubular structure to define two intersection lines, and
   wherein the maximum curvature of the blood vessel is defined as a curvature of either of the intersection lines.

4. The method according to claim 2, wherein a curve inside the tubular structure is fitted such that a maximum linear curvature is minimal, and wherein the maximum curvature of the blood vessel is defined as a maximum linear curvature of the curve.

5. The method according to claim 1, further comprising indicating the maximum curvature in the medical image.

6. The method according to claim 5, wherein the maximum curvature is indicated with reference to the blood vessel on the medical image.

7. The method according to claim 1, further comprising identifying a smallest diameter as another property of the blood vessel along the length of the segmented blood vessel.

8. The method according to claim 7, wherein the smallest diameter is indicated with reference to the blood vessel on the medical image.

9. The method according to claim 1, wherein the medical image comprises a plurality of blood vessels, and the method further comprising:
   displaying the medical image comprising the plurality of blood vessels; and
   manually selecting a blood vessel from the plurality of blood vessels in the medical image and determining the maximum curvature of the manually selected blood vessel.

10. The method according to claim 1, further comprising:
    selecting a portion of the blood vessel; and
    determining the maximum curvature along a length of the portion of the blood vessel.

11. The method according to claim 1, further comprising:
    computing a centerline of the blood vessel; and
    determining a maximum curvature of the centerline as the maximum curvature of the blood vessel.

12. The method according to claim 1, further comprising:
    computing a centerline of the blood vessel;
    computing a diameter of the blood vessel along the centerline as an approximated tubular structure of the blood vessel; and
    determining a maximum curvature of the approximated tubular structure as the maximum curvature of the blood vessel.

13. The method according to claim 1, further comprising identifying a blood flow direction inside the blood vessel as another property of the blood vessel.

14. A system for determining a property of a blood vessel in a medical image, comprising:
    a processor adapted for segmenting the blood vessel in the medical image, wherein the processor identifies the segmented blood vessel comprising a first end and a second end opposite to the first end; and
    a display device adapted to display the medical image and the segmented blood vessel extending from the first end to the second end in the medical image,
    wherein the processor is further adapted to:
        determine a shortest path on the segmented blood vessel that a catheter can take to traverse from the first end to the second end; and
        determine a maximum curvature of the a shortest path along the segmented blood vessel as the property of the blood vessel.

15. The system according to claim 14, further comprising a selector for manually selecting the blood vessel in the medical image.

16. The system according to claim 15, wherein the selector is adapted to select only a portion of the blood vessel.

17. The system according to claim 14, wherein the processor is further adapted to identify a smallest diameter as another property of the blood vessel along a length of the segmented blood vessel.

18. The system according to claim 14, wherein the processor is further adapted to identify a blood flow direction inside the segmented blood vessel as another property of the blood vessel.

* * * * *